(12) United States Patent
Kawase

(10) Patent No.: US 10,969,347 B2
(45) Date of Patent: Apr. 6, 2021

(54) X-RAY GENERATION APPARATUS AND X-RAY IMAGING APPARATUS

(71) Applicant: Canon Anelva Corporation, Kawasaki (JP)

(72) Inventor: Junya Kawase, Yokohama (JP)

(73) Assignee: CANON ANELVA CORPORATION, Kawasaki (JP)

( * ) Notice: Subject to any disclaimer, the term of this patent is extended or adjusted under 35 U.S.C. 154(b) by 0 days.

(21) Appl. No.: 17/010,204

(22) Filed: Sep. 2, 2020

(65) Prior Publication Data

US 2021/0063324 A1 Mar. 4, 2021

Related U.S. Application Data

(63) Continuation of application No. PCT/JP2019/034639, filed on Sep. 3, 2019.

(51) Int. Cl.
*H01J 35/18* (2006.01)
*G01N 23/04* (2018.01)
(Continued)

(52) U.S. Cl.
CPC ........... *G01N 23/04* (2013.01); *G01N 23/083* (2013.01); *H01J 35/064* (2019.05); *H01J 35/08* (2013.01);
(Continued)

(58) Field of Classification Search
None
See application file for complete search history.

(56) References Cited

U.S. PATENT DOCUMENTS

2014/0369467 A1* 12/2014 Yamazaki ............... H01J 9/395
378/51
2015/0098552 A1* 4/2015 Draper ..................... H05G 1/06
378/142

(Continued)

FOREIGN PATENT DOCUMENTS

JP 2007080568 A 3/2007
JP 2018073625 A 5/2018

OTHER PUBLICATIONS

International Search Report (PCT/ISA/210) and Written Opinion (PCT/ISA/237) dated Nov. 5, 2019, by the Japanese Patent Office as the International Searching Authority for International Application No. PCT/JP2019/034639.

*Primary Examiner* — Hoon K Song
(74) *Attorney, Agent, or Firm* — Buchanan Ingersoll & Rooney PC

(57) ABSTRACT

X-ray generation apparatus includes X-ray generation tube having cathode and anode, voltage supply for supplying voltage to the X-ray generation tube via conductive line, storage container including first portion forming first space storing the voltage supply, second portion forming second space having width smaller than that of the first space and storing the X-ray generation tube, and connecting portion connecting the first and second portions to form internal space in which the first space and the second space communicate, and insulating member arranged in the internal space to block shortest path between the conductive line and convex portion of the connecting portion. The insulating member is formed by connecting members by adhesive material, and is configured to block linear path between the adhesive material and the conductive line and linear path between the adhesive material and the cathode.

11 Claims, 6 Drawing Sheets

(51) Int. Cl.
*G01N 23/083* (2018.01)
*H01J 35/06* (2006.01)
*H01J 35/08* (2006.01)

(52) U.S. Cl.
CPC .......... *H01J 35/18* (2013.01); *G01N 2223/04* (2013.01); *G01N 2223/40* (2013.01)

(56) References Cited

U.S. PATENT DOCUMENTS

2019/0150255 A1* 5/2019 Kawase .................. H05G 1/06
378/111
2020/0211808 A1* 7/2020 Ando ...................... H01J 35/08

* cited by examiner

X-RAY GENERATION APPARATUS AND X-RAY IMAGING APPARATUS

CROSS-REFERENCE TO RELATED APPLICATION(S)

This application is a continuation of International Patent Application No. PCT/JP2019/034639 filed on Sep. 3, 2019, the entire disclosures of which is incorporated herein by reference.

BACKGROUND OF THE INVENTION

Field of the Invention

The present invention relates to an X-ray generation apparatus and an X-ray imaging apparatus.

Description of the Related Art

The enlargement ratio of an X-ray fluoroscopic image can increase as the distance between an object and an X-ray generation unit formed on a target is short. There is known an X-ray generation apparatus in which to obtain a sufficient enlargement ratio even in a case in which the object is located at a deep position, a projecting portion long projecting from the main body portion of a storage container is provided on the main body portion, and an X-ray generation unit is attached to the distal end of the projecting portion. Such an X-ray generation apparatus is described in Japanese Patent Laid-Open No. 2018-73625.

Japanese Patent Laid-Open No. 2018-73625 describes an X-ray generation apparatus including an X-ray generation tube, and a storage container that stores the X-ray generation tube. The X-ray generation tube includes an anode, a cathode including an electron emitting portion source, and an insulating tube that forms a vacuum space between the anode and the cathode. The anode is electrically connected to the storage container. The storage container includes a rear storage portion, a flange portion that approaches the insulating tube of the X-ray generation tube from a portion continued from the rear storage portion and surrounds the insulating tube, and a projecting portion projecting from the flange portion. The anode of the X-ray generation tube is fixed to the projecting portion. An annular bending portion is formed between the projecting portion and the flange portion. A protective member is arranged between the cathode of the X-ray generation tube and the annular bending portion. The protective member is an annular member formed by rotating an L-shaped section.

The above-described annular member of Japanese Patent Laid-Open No. 2018-73625 can be manufactured by, for example, producing a plurality of members and connecting them by an adhesive material. However, experiments by the present applicant have revealed that if an annular member manufactured by such a method is used in an X-ray generation apparatus, discharge penetrating the adhesive material can occur.

SUMMARY OF THE INVENTION

The present invention provides an X-ray generation apparatus having a structure advantageous in suppressing occurrence of discharge penetrating an adhesive material.

According to one aspect of the present invention, there is provided an X-ray generation apparatus comprising an X-ray generation tube including a cathode having an electron emitting portion configured to emit electrons in a first direction, and an anode including a target configured to generate X-rays upon collision of the electrons radiated from the electron emitting portion, a voltage supply configured to supply a voltage to the X-ray generation tube via a conductive line, a storage container including a first portion configured to form a first space that stores the voltage supply, a second portion configured to form a second space whose width in a second direction orthogonal to the first direction is smaller than that of the first space and which stores the X-ray generation tube, and a connecting portion configured to connect the first portion and the second portion to each other to form an internal space in which the first space and the second space communicate, the connecting portion including a convex portion pointed toward the internal space, and an insulating member arranged in the internal space to surround at least a portion of at least one of the conductive line and the cathode, wherein the insulating member is arranged to block at least a shortest path between the conductive line and the convex portion, and the insulating member has a structure formed by connecting at least two members by an adhesive material, and is configured to block a linear path between the adhesive material and the conductive line and a linear path between the adhesive material and the cathode.

Further features of the present invention will become apparent from the following description of exemplary embodiments with reference to the attached drawings.

DESCRIPTION OF EMBODIMENTS

Figure 1:
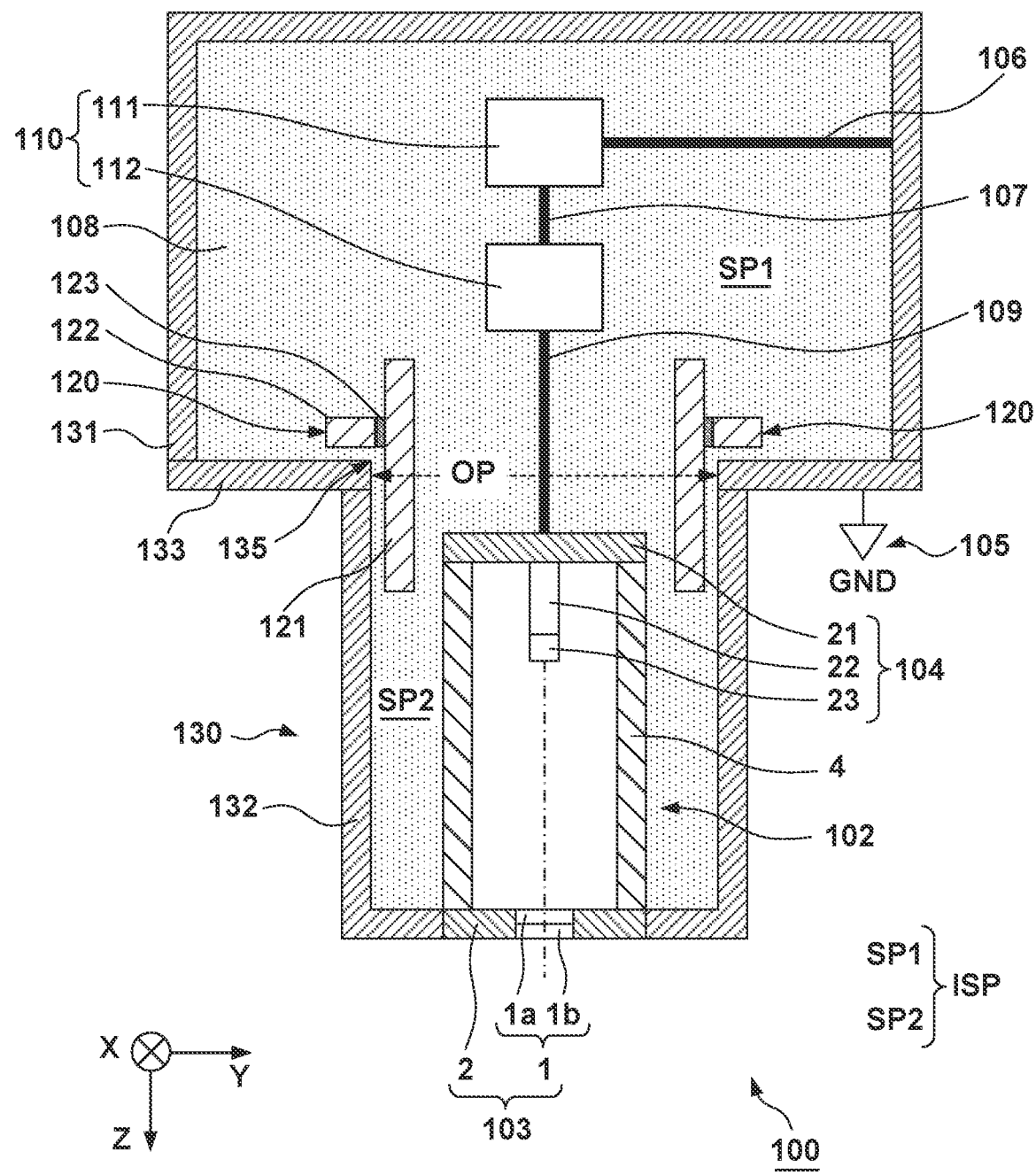
FIG. 1 is a view showing the arrangement of an X-ray generation apparatus according to the first embodiment.

Hereinafter, embodiments will be described in detail with reference to the accompanying drawings. It should be noted that the following embodiments are not intended to limit the scope of the appended claims. A plurality of features are described in the embodiments. However, not all the combinations of the plurality of features are necessarily essential to the present invention, and the plurality of features may arbitrarily be combined. In addition, the same reference numerals denote the same or similar parts in the accompanying drawings, and a repetitive description will be omitted.

FIG. 1 schematically shows the arrangement of an X-ray generation apparatus 100 according to the first embodiment. The X-ray generation apparatus 100 can include an X-ray generation tube 102, a voltage supply 110, a storage container 130, an insulating liquid 108, and an insulating member 120. The X-ray generation tube 102 can include a cathode 104 including an electron emitting portion 23 that emits electrons in the first direction (Z direction) that is a tube axis direction, and an anode 103 including a target 1 that generates X-rays upon collision of the electrons radiated from the electron emitting portion 23. The voltage supply 110 supplies a voltage to the X-ray generation tube 102, more specifically, to the cathode 104 via a conductive line 109. The conductive line 109 can include a conductive member and an insulating member that covers the conductive member, but may not include the insulating member.

The storage container 130 can include a first portion 131, a second portion 132, and a connecting portion 133. The first portion 131 can store the voltage supply 110. The second portion 132 can store the X-ray generation tube 102. The connecting portion 133 can connect the first portion 131 and the second portion 132 to each other to form an internal space ISP in which a first space SP1 inside the first portion 131 and a second space SP2 inside the second portion 132 communicate. The width of the second portion 132 in the second direction (Y direction) orthogonal to the first direction (Z direction) is smaller than that of the first portion 131. In addition, the width of the second space SP2 in the second direction (Y direction) orthogonal to the first direction (Z direction) is smaller than that of the first space SP1. The connecting portion 133 can include a convex portion 135 pointed toward the internal space ISP of the storage container 130. The second portion 132 can have, for example, a tubular shape such as a cylindrical shape. In a section of the convex portion 135 (for example, a sectional view like FIG. 1), the convex portion 135 may have an internal angle of 90° or an acute internal angle or an obtuse internal angle. In the first direction (Z direction), the cathode 104 of the X-ray generation tube 102 can be located between the convex portion 135 of the connecting portion 133 and the anode 103 of the X-ray generation tube 102. In the example shown in FIG. 1, the length of the second portion 132 in the first direction (Z direction) is longer than that of the X-ray generation tube 102.

The insulating liquid 108 can fill the internal space ISP of the storage container 130 to be in contact with the cathode 104 and surround the conductive line 109. The insulating member 120 can be arranged in the internal space ISP of the storage container 130 to surround at least a portion of at least one of the conductive line 109 and the cathode 104.

The insulating member 120 can be arranged in the internal space ISP of the storage container 130 to surround at least a portion of, for example, the conductive line 109. The insulating member 120 can be arranged to block at least the shortest path between the conductive line 109 and the convex portion 135 of the connecting portion 133. The insulating member 120 can be arranged to block the linear path between the conductive line 109 and the convex portion 135 of the connecting portion 133 in the whole path of the conductive line 109 between the voltage supply 110 and the cathode 104. Additionally, the insulating member 120 can be arranged to block the linear path between a cathode member 21 and the convex portion 135 of the connecting portion 133.

The insulating member 120 can be arranged to surround, for example, at least a portion of the cathode 104, for example, the cathode member 21. The at least a portion of the cathode 104, for example, the cathode member 21 can be arranged to face the insulating member 120 via the insulating liquid 108. In (a sectional view of) a plane orthogonal to the first direction (Z direction), the at least a portion of the cathode 104, for example, the cathode member 21 can be arranged to face the insulating member 120 via the insulating liquid 108. In (the sectional view of) the plane, the insulating member 120 can face the second portion 132 via the insulating liquid 108. The insulating member 120 need only be an insulating solid, and ceramic, a glass material, a resin material such as an epoxy glass laminated plate, or the like can be applied. The insulating member 120 preferably has an insulation property of $1\times10^5$ Ωm or more in a volume resistance at 25° C.

The target 1 of the X-ray generation tube 102 stored in the second portion 132 can be located at the distal end (the lower end in FIG. 1) of the second portion 132. Since the target 1 is an X-ray generation portion that generates X-rays, the arrangement as described above is advantageous in making the X-ray generation portion close to an object, that is, improving the enlargement ratio at the time of imaging.

The X-ray generation tube 102 can be a transmission-type X-ray generation tube. The X-ray generation tube 102 can include the anode 103, the cathode 104, and an insulating tube 4. The anode 103, the cathode member 21, and the insulating tube 4 constitute a vacuum airtight container. The insulating tube 4 has a tubular shape, for example, a cylindrical shape, and connects the anode 103 and the cathode 104 while insulating them from each other. The anode 103 can include the target 1 and an anode member 2. The target 1 can include a target layer 1a, and a support window 1b that supports the target layer 1a. The anode member 2 can have an annular shape. The anode member 2 supports the target 1. The anode member 2 can electrically be connected to the target layer 1a. The anode member 2 and the support window 1b can be connected by, for example, a brazing material. In the example shown in FIG. 1, the target 1 and the distal end of the second portion 132 are arranged on the same plane. However, the target 1 may be arranged to project outward from the distal end of the second portion 132 or may be arranged to be recessed from the distal end of the second portion 132 as long as the target 1 is set at the same potential as the second portion 132 (that is, grounded). The form in which the target 1 is located at the distal end of the second portion 132 can include such a form as well.

The target layer 1a contains, for example, a heavy metal such as tungsten or tantalum, and generates X-rays when irradiated with electrons. The thickness of the target layer 1a can be decided based on the balance between the electron penetration length that contributes to generation of X-rays and the self-attenuation amount when the generated X-rays pass through the support window 1b. The thickness of the target layer 1a can fall within the range of, for example, 1 µm to several tens of µm.

The support window 1b has a function of passing the X-rays generated in the target layer 1a and radiating them out of the X-ray generation tube 102. The support window 1b can be made of a material that passes X-rays, for example, beryllium, aluminum, silicon nitride, or an allotrope of carbon. To effectively transmit heat generated in the target layer 1a to the anode member 2, the support window 1b can be made of, for example, diamond that has a high heat conductivity.

The insulating tube 4 can be made of a ceramic material such as alumina or zirconia having vacuum airtightness and insulating properties, soda lime, or a glass material such as silica. From a viewpoint of reducing the thermal stress with respect to the insulating tube 4, the cathode member 21 and the anode member 2 can be made of materials having linear expansion coefficients αc (ppm/° C.) and αa (ppm/° C.), respectively, which are close to a linear expansion coefficient αi (ppm/° C.) of the insulating tube 4. The cathode member 21 and the anode member 2 can be made of, for example, an alloy such as Kovar or Monel.

The cathode 104 can include the electron emitting portion 23, the cathode member 21, and a fixing portion 22 that fixes the electron emitting portion 23 to the cathode member 21. For example, to the cathode member 21, the electron emitting portion 23 may be connected via a brazing material, may thermally be fused by laser welding or the like, or may electrically be connected by another method. The electron emitting portion 23 can include an electron source such as an impregnated type thermion source, a filament type thermion source, or a cold cathode electron source. The electron emitting portion 23 can include an electrostatic lens electrode (not shown) such as an extraction grid electrode or a focusing lens electrode, which defines an electrostatic field. The fixing portion 22 can have a tubular shape that passes the conductive line 109 electrically connected to the electron source and the electrostatic lens electrode. The conductive line 109 can include a plurality of conductive members insulated from each other.

The X-ray generation apparatus 100 can be formed as an anode grounded type in which the anode 103 is grounded. In the anode grounded type, the anode 103 can electrically be connected to the storage container 130. The storage container 130 can electrically be connected to a ground terminal 105. The cathode 104 can electrically be connected to the voltage supply 110 via the conductive line 109.

The voltage supply 110 can include a power supply circuit 111, and a driving circuit 112 that receives power supplied from the power supply circuit 111 via a power supply line 107 and drives the X-ray generation tube 102 via the conductive line 109. The driving circuit 112 can electrically be connected to the storage container 130 via the power supply line 107, the power supply circuit 111, and a grounding wire 106. The driving circuit 112 can control the emitted electron amount from the electron source or the electron beam diameter by controlling voltages to be supplied to the electron source, the extraction grid electrode, the focusing lens electrode, and the like. The positive electrode terminal of the power supply circuit 111 is grounded via the ground wire 106 and the storage container 130, and the negative electrode terminal of the power supply circuit 111 is connected to the driving circuit 112 via the power supply line 107 to supply a negative voltage to the driving circuit 112. A control signal can be supplied to the driving circuit 112 from, for example, a controller (not shown) arranged outside the storage container 130 via a cable such as an optical fiber cable.

The first portion 131, the second portion 132, and the connecting portion 133, which form the storage container 130, can be made of a material with conductivity, electrically connected to each other, and grounded. This arrangement is advantageous in ensuring electrical safety. The first portion 131, the second portion 132, and the connecting portion 133 can be made of a metal material. The insulating liquid 108 can vacuum-fill the storage container 130. The reason for this is that if bubbles exist in the insulating liquid 108, a region whose dielectric constant is lower as compared to the insulating liquid 108 on the periphery is locally formed, resulting in discharge.

The insulating liquid 108 also has a function of suppressing discharge between the X-ray generation tube 102 and the storage container 130 and discharge between the voltage supply 110 (the power supply circuit 111 and the driving circuit 112) and the storage container 130. As the insulating liquid 108, a liquid having excellent heat resistance, liquidity, and electrical insulating properties in the operating temperature range of the X-ray generation apparatus 100, for example, a chemical synthetic oil such as silicone oil or fluororesin-based oil, a mineral oil, or the like can be used.

The X-ray generation tube 102 can be joined to the opening portion provided at the distal end (the lower end in FIG. 1) of the second portion 132 of the storage container 130 and thus fixed to the second portion 132. The space between the X-ray generation tube 102 and the inner side surface of the second portion 132 can be filled with the insulating liquid 108. The power supply circuit 111 and the driving circuit 112 can be fixed to the first portion 131 of the storage container 130 by a fixing member (not shown). The power supply circuit 111 and the driving circuit 112 can be surrounded by the insulating liquid 108.

The conductive line 109 can be surrounded by the insulating liquid 108. The connecting portion 133 of the storage container 130 includes, for example, a plate portion spreading in a direction orthogonal to the first direction (Z direction), and the plate portion includes an opening OP through which the conductive line 109 passes. The plate portion can contact the attachment surface of a structure (for example, a housing) that supports the X-ray generation apparatus 100. Alternatively, the plate portion can be fitted in the opening portion of the structure that supports the X-ray generation apparatus 100. In the storage container 130, the side surface of the opening OP of the plate portion and the inner side surface of the second portion 132 can form a continuous surface without a step. In an example, the opening OP can be a circular opening, and the inner side surface of the second portion 132 can be a cylindrical surface. The convex portion 135 can be formed by the end of the opening OP.

The insulating member 120 has a structure formed by connecting at least two members (121 and 122) by an adhesive material 123, and can be formed to block the linear path between the adhesive material 123 and the conductive line 109 and the linear path between the adhesive material 123 and the cathode 104. With this arrangement, occurrence of discharge between the conductive line 109 and the convex portion 135 can be suppressed via the adhesive material 123. Alternatively, the insulating member 120 can be formed to block the linear path between the adhesive material 123 that connects the at least two members (121 and 122) forming the insulating member 120 and at least a part of the cathode 104, for example, the cathode member 21. With this arrangement, occurrence of discharge between the cathode 104 and the convex portion 135 can be suppressed via the adhesive material 123.

In a detailed arrangement example, the insulating member 120 can includes, as the at least two members, the tubular portion 121 and the flange portion 122 extending outward from the tubular portion 121. In an example, the tubular portion 121 can include a cylindrical proton, and the flange portion 122 can include a ring-shaped portion. The insulating member 120 can have a structure formed by connecting (bonding) the tubular portion 121 and the flange portion 122 by the adhesive material 123. The flange portion 122 can extend along, for example, the plate portion of the connecting portion 133. More specifically, the flange portion 122 can be arranged in parallel to, for example, the plate portion of the connecting portion 133. As for the adhesive material 123, at least its state after curing need only be an insulating solid, and can be, for example, epoxy resin or a phenol resin. The flange portion 122 can include a through hole, and a part of the tubular portion 121 can be located in the through hole.

In the first embodiment, the adhesive material 123 can be arranged between the inner surface of the through hole of the flange portion 122 and a region of the outer surface of the tubular portion 121, which faces the inner surface. In other words, the tubular portion 121 is arranged between the adhesive material 123 and the conductive line 109 and between the adhesive material 123 and the cathode member 21. With this arrangement, occurrence of discharge between the conductive line 109 and the convex portion 135 and discharge between the cathode 104 and the convex portion 135 can be suppressed via the adhesive material 123.

The tubular portion 121 can be arranged to surround at least a part of the insulating tube 4 of the X-ray generation tube 102. Here, the tubular portion 121 may be arranged to surround the whole insulating tube 4 or may be arranged to surround only a part of the insulating tube 4. The flange portion 122 may be arranged such that the entire flange portion 122 or a part of it is in contact with the connecting portion 133. In addition, the flange portion 122 may be arranged such that the entire flange portion 122 or a part of it is in contact with the second portion 132.

The whole cathode 104 of the X-ray generation tube 102 can be arranged in the second space SP2. In another viewpoint, the cathode 104 of the X-ray generation tube 102 can be arranged between the anode 103 of the X-ray generation tube 102 and the opening OP of the connecting portion 133. In still another viewpoint, the cathode 104 of the X-ray generation tube 102 can be arranged such that the whole lateral side of the cathode 104 is surrounded by the second portion 132.

A virtual line (or conical surface) that connects one of the two ends of the conductive line 109 on the side of the voltage supply 110 (driving circuit 112) to the convex portion 135 can intersect the insulating member 120. A virtual line (or conical surface) that connects one of the two ends of the conductive line 109 on the side of cathode 104 to the convex portion 135 can intersect the insulating member 120. A virtual line that connects any position between the two ends of the conductive line 109 to the convex portion 135 can intersect the insulating member 120. A virtual line that connects the voltage supply 110 to the convex portion 135 can intersect the insulating member 120. In a physical space, the driving circuit 112 is arranged between the power supply circuit 111 and the cathode 104, and a virtual line that connects the driving circuit 112 to the convex portion 135 can intersect the insulating member 120.

Such an unstable operation is solved by arranging the insulating member 120 to block the linear path between the conductive line 109 and the convex portion 135 of the connecting portion 133. As another solution, the dimension of the opening OP that defines the convex portion 135 is made large, thereby increasing the distance between the convex portion 135 and the conductive line 109. However, this method is not preferable because it leads to an increase in the size of the X-ray generation apparatus 100.

Figure 2:
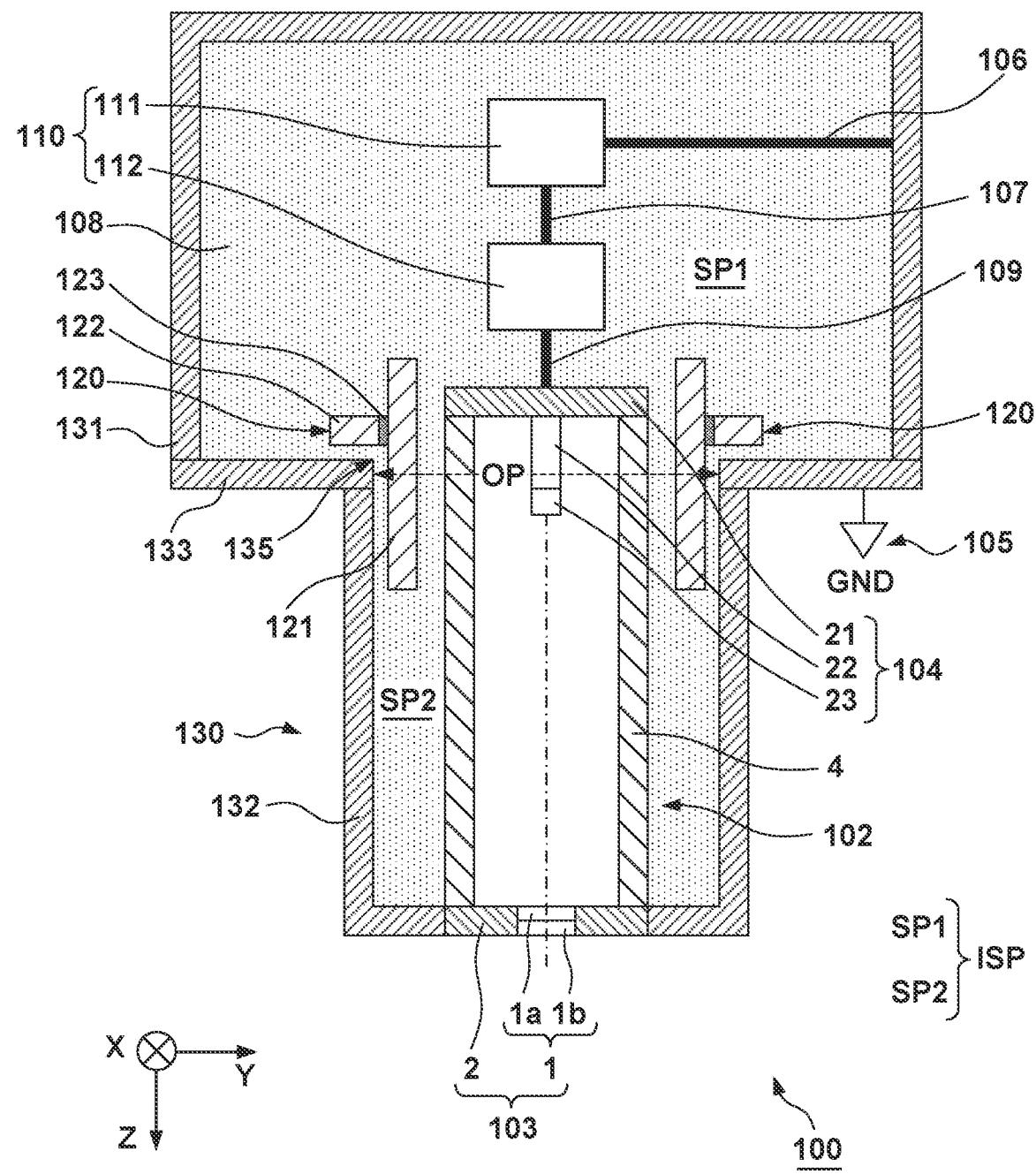
FIG. 2 is a view showing the arrangement of an X-ray generation apparatus according to the second embodiment.

An X-ray generation apparatus 100 according to the second embodiment will be described below with reference to FIG. 2. Matters that are not mentioned as the X-ray generation apparatus 100 according to the second embodiment can comply with the first embodiment. In the second embodiment, the X-ray generation apparatus 100 has a structure in which a convex portion 135 is arranged between a cathode 104 and an anode 103 in the first direction (Z direction) that is the tube axis direction of an X-ray generation tube 102. In the example shown in FIG. 2, the length of a second portion 132 in the first direction (Z direction) is shorter than that of the X-ray generation tube 102.

Figure 3:
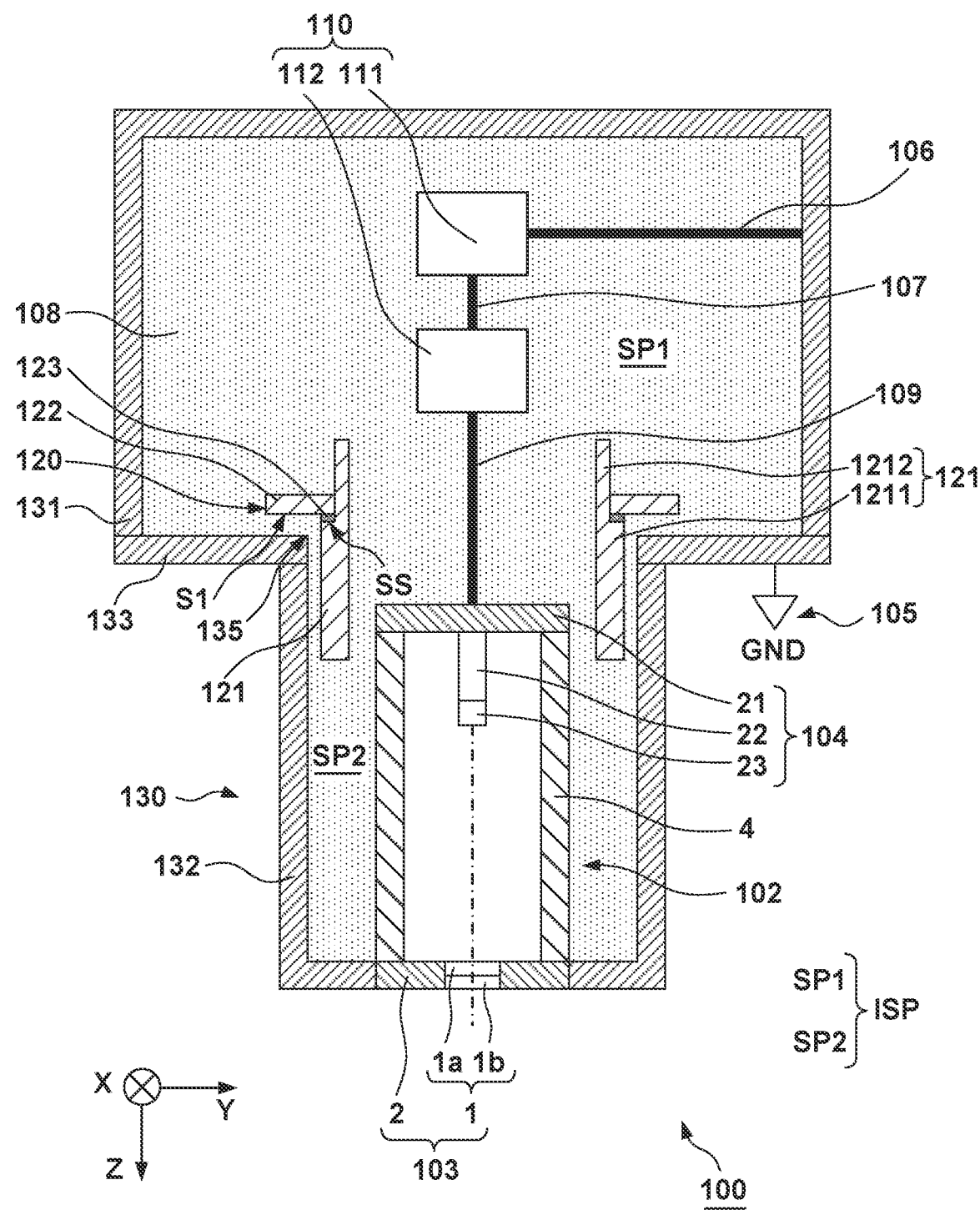
FIG. 3 is a view showing the first modification of an insulating member applicable to the X-ray generation apparatus according to the first or second embodiment.
Figure 4:
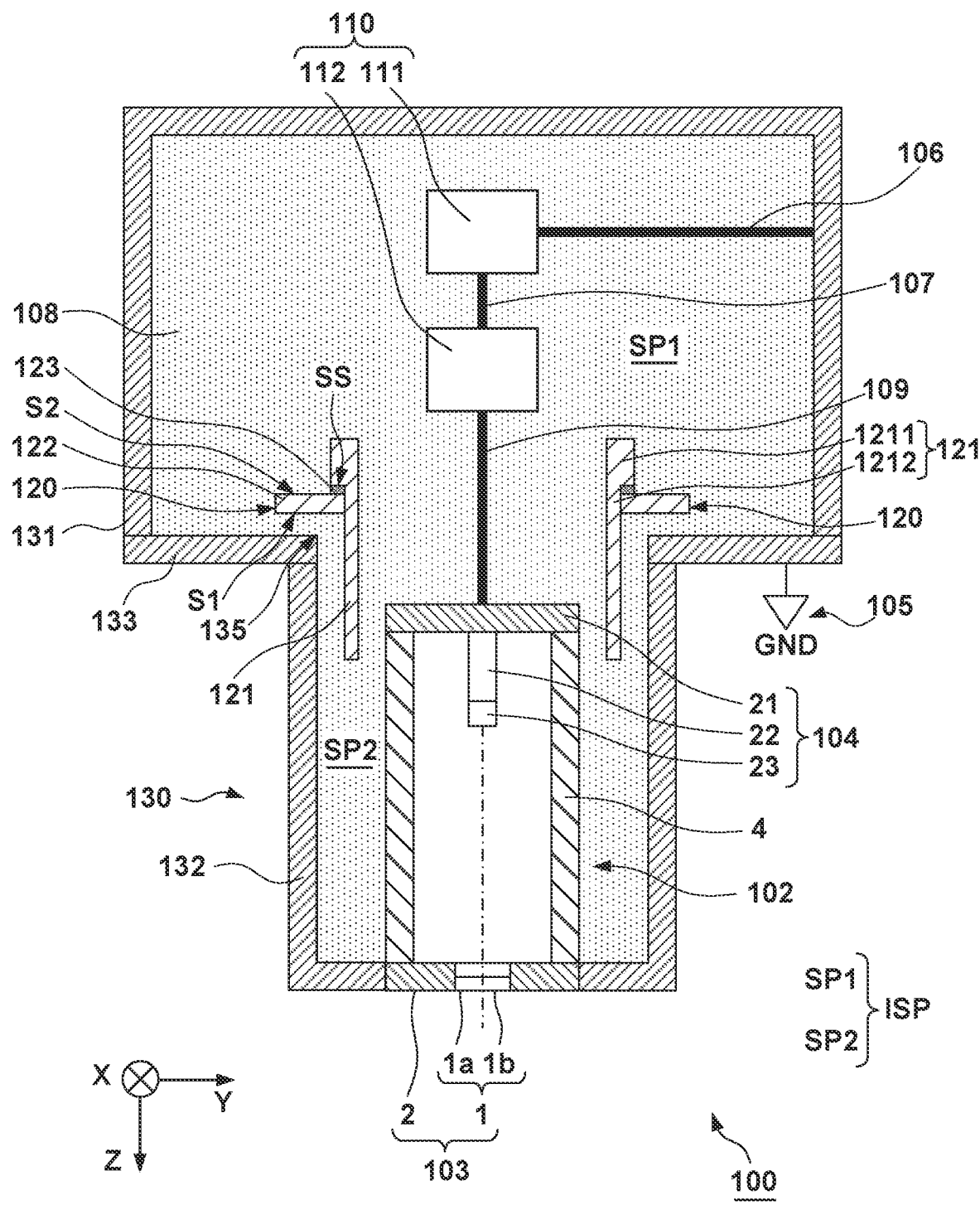
FIG. 4 is a view showing the second modification of the insulating member applicable to the X-ray generation apparatus according to the first or second embodiment.
Figure 5:
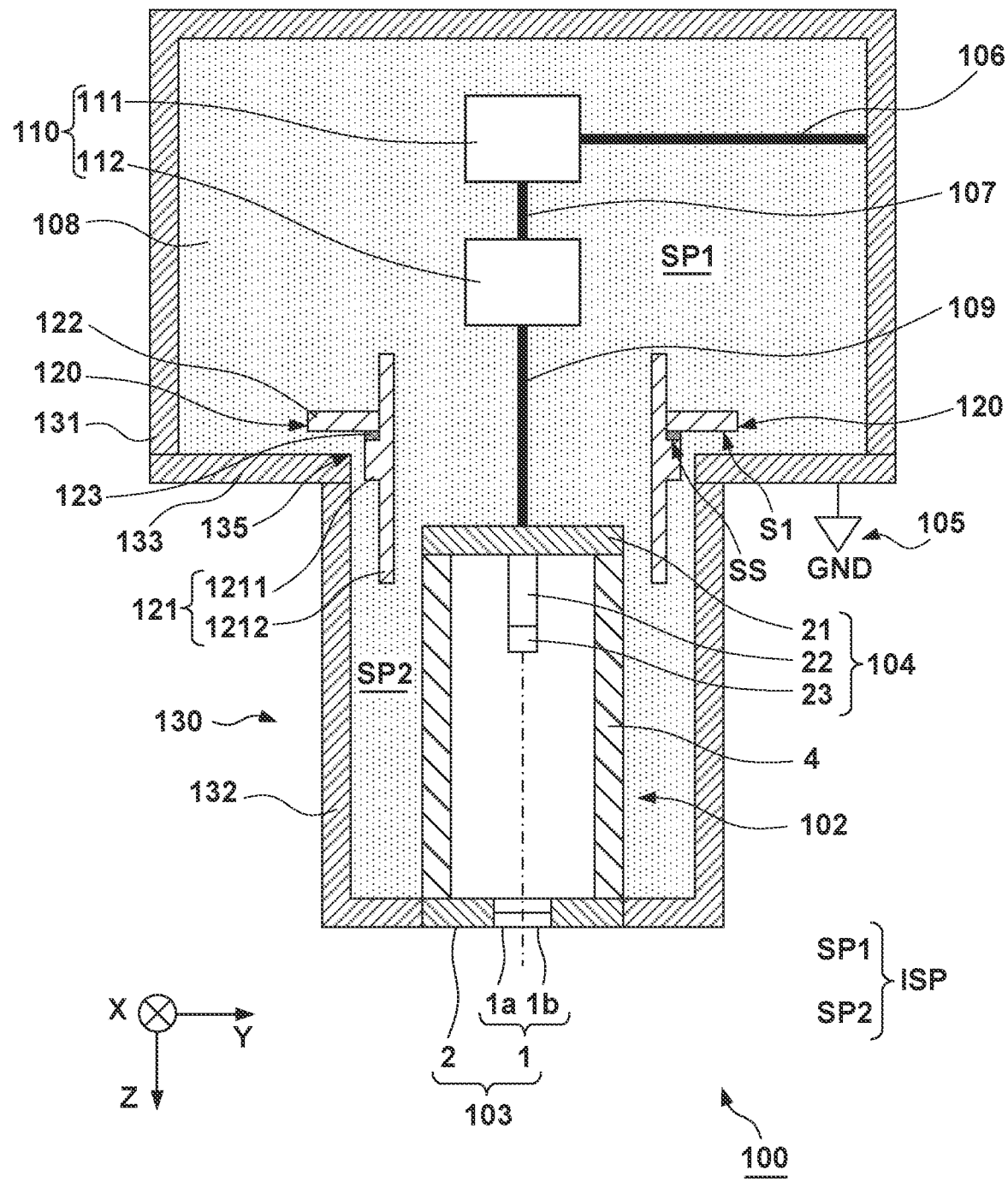
FIG. 5 is a view showing the third modification of the insulating member applicable to the X-ray generation apparatus according to the first or second embodiment.

FIGS. 3, 4, and 5 show the first, second, and third modifications of the insulating member 120 of the X-ray generation apparatus 100 according to the first embodiment.

The first, second, and third modifications of the insulating member 120 shown in FIGS. 3 to 5 may be applied to the second embodiment.

In the first and second embodiments, the adhesive material 123 can be arranged between the inner surface of the through hole of the flange portion 122 and a region of the outer surface of the tubular portion 121, which faces the inner surface. On the other hand, in the first, second, and third modifications, the adhesive material 123 can be arranged between a surface of the flange portion 122, which extends in the radial direction (second direction), and a region of the outer surface of the tubular portion 121, which faces the surface. In the arrangement as in the first, second, and third modifications, the flange portion 122 can easily strongly be pressed against the tubular portion 121 via the adhesive material 123. Hence, the arrangement is advantageous in, for example, eliminating bubbles that can be taken by the adhesive material 123. This can improve the insulating performance. Further, when the two members 121 and 122 are more strongly pressed, the thickness (the sizes in the first direction) of the adhesive material 123 can be made smaller, and the width (the sizes in the second direction) of the adhesive material 123 can be made larger. Hence, the insulating performance can be made higher.

More specifically, in the first, second, and third modifications, the tubular portion 121 can include a first portion 1211 whose size (outer diameter) in the second direction (for example, the X direction or Y direction) is larger than the size (hole diameter) of the through hole of the flange portion 122 in the second direction, and a second portion 1212 which extends from the first portion 1211 in the first direction (for example, the Z direction) and whose size (outer diameter) in the second direction is smaller than the size (hole diameter) of the through hole of the flange portion 122 in the second direction. A step surface SS is formed on the outer peripheral surface of the tubular portion 121 by the first portion 1211 and the second portion 1212, and the adhesive material 123 is arranged between the step surface SS and an adhesive region of the flange portion 122, which faces the step surface SS. The step surface SS extends in the radial direction (second direction) on the outer surface of the tubular portion 121.

In the first modification shown in FIG. 3 and the third modification shown in FIG. 5, the flange portion 122 includes a first surface S1 with a portion facing the connecting portion 133, the adhesive region of the flange portion 122 is provided on the first surface S1, and the adhesive material 123 is arranged between the adhesive region and the step surface SS. In the second modification shown in FIG. 4, the flange portion 122 includes the first surface S1 with a portion facing the connecting portion 133, and a second surface S2 on the opposite side of the first surface S1. The adhesive region of the flange portion 122 is provided on the second surface S2, and the adhesive material 123 is arranged between the adhesive region and the step surface SS. Since the flange portion 122 can easily strongly be pressed against the step surface SS of the tubular portion 121 via the adhesive material 123 at the time of manufacturing of the insulating member 120, the first, second, and third modifications are advantageous in, for example, eliminating bubbles that can be taken by the adhesive material 123. This can improve the insulating performance.

Figure 6:
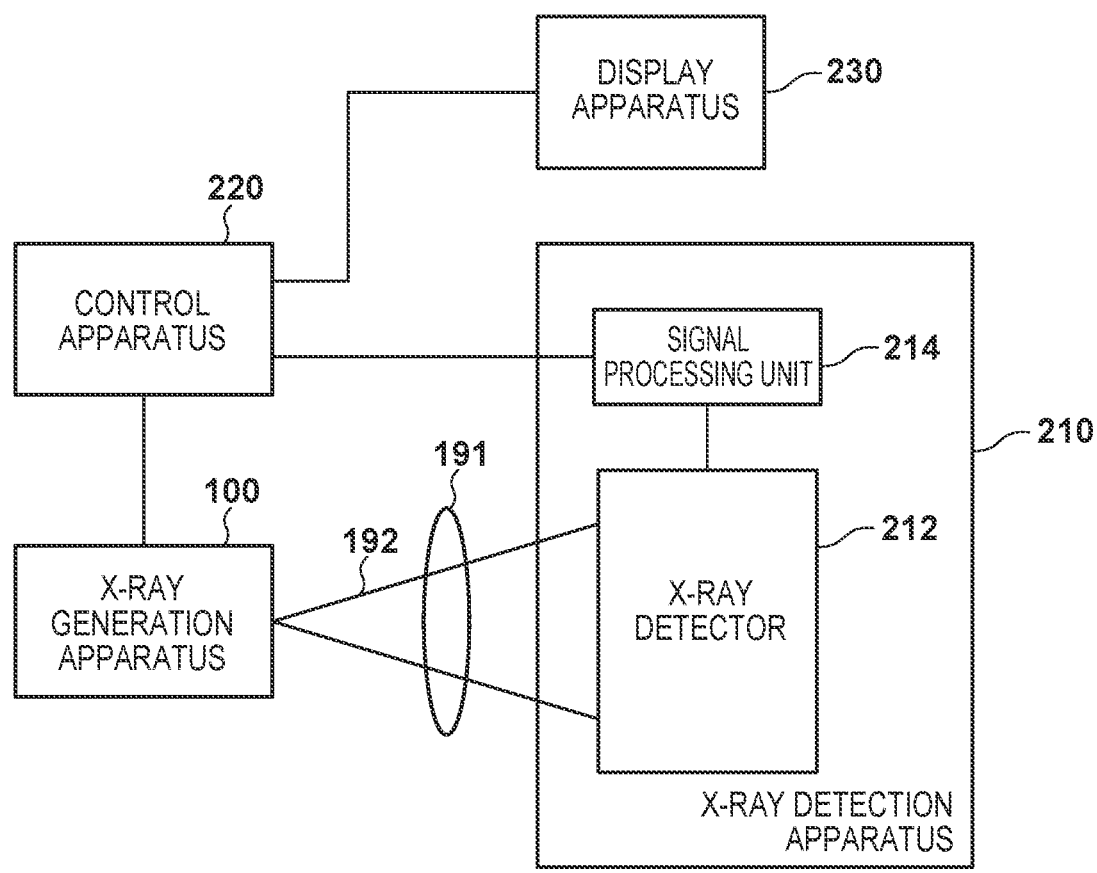
FIG. 6 is a view showing the arrangement of an X-ray imaging apparatus according to an embodiment.

FIG. 6 shows the arrangement of an X-ray imaging apparatus 200 according to an embodiment. The X-ray imaging apparatus 200 can include the X-ray generation apparatus 100, and an X-ray detection apparatus 210 that detects X-rays 192 radiated from the X-ray generation apparatus 100 and transmitted through an object 191. The X-ray imaging apparatus 200 may further include a control apparatus 220 and a display apparatus 230. The X-ray detection apparatus 210 can include an X-ray detector 212 and a signal processer 214. The control apparatus 220 can control the X-ray generation apparatus 100 and the X-ray detection apparatus 210. The X-ray detector 212 detects or captures the X-rays 192 radiated from the X-ray generation apparatus 100 and transmitted through the object 191. The signal processer 214 can process a signal output from the X-ray detector 212 and supply the processed signal to the control apparatus 220. The control apparatus 220 causes the display apparatus 230 to display an image based on the signal supplied from the signal processer 214.

The present invention is not limited to the above embodiments, and various changes and modifications can be made within the spirit and scope of the present invention. Therefore, to apprise the public of the scope of the present invention, the following claims are made.

What is claimed is:

1. An X-ray generation apparatus comprising:
an X-ray generation tube including a cathode having an electron emitting portion configured to emit electrons in a first direction, and an anode including a target configured to generate X-rays upon collision of the electrons radiated from the electron emitting portion;
a voltage supply configured to supply a voltage to the X-ray generation tube via a conductive line;
a storage container including a first portion configured to form a first space that stores the voltage supply, a second portion configured to form a second space whose width in a second direction orthogonal to the first direction is smaller than that of the first space and which stores the X-ray generation tube, and a connecting portion configured to connect the first portion and the second portion to each other to form an internal space in which the first space and the second space communicate, the connecting portion including a convex portion pointed toward the internal space; and
an insulating member arranged in the internal space to surround at least a portion of at least one of the conductive line and the cathode,
wherein the insulating member is arranged to block at least a shortest path between the conductive line and the convex portion, and
the insulating member has a structure formed by connecting at least two members by an adhesive material, and is configured to block a linear path between the adhesive material and the conductive line and a linear path between the adhesive material and the cathode.

2. The X-ray generation apparatus according to claim 1, wherein the at least two members include a tubular portion, and a flange portion extending outward from the tubular portion.

3. The X-ray generation apparatus according to claim 2, wherein the flange portion includes a through hole, and a portion of the tubular portion is located in the through hole.

4. The X-ray generation apparatus according to claim 3, wherein the adhesive material is arranged between an inner surface of the through hole and a region of an outer surface of the tubular portion, which faces the inner surface.

5. The X-ray generation apparatus according to claim 3, wherein the tubular portion includes a first portion having an outer diameter larger than a hole diameter of the through hole, and a second portion extending from the first portion in the first direction and having an outer diameter smaller than the hole diameter of the through hole, and a step surface is formed on an outer peripheral surface of the tubular portion by an outer peripheral surface of the first portion and an outer peripheral surface of the second portion, and
the adhesive material is arranged between the step surface and an adhesive region of the flange portion, which faces the step surface.

6. The X-ray generation apparatus according to claim 5, wherein the flange portion includes a first surface with a portion facing the connecting portion, and the adhesive region is provided on the first surface.

7. The X-ray generation apparatus according to claim 5, wherein the flange portion includes a first surface with a portion facing the connecting portion, and a second surface on an opposite side of the first surface, and the adhesive region is provided on the second surface.

8. The X-ray generation apparatus according to claim 1, wherein in the first direction, the cathode is arranged between the convex portion and the anode.

9. The X-ray generation apparatus according to claim 1, wherein in the first direction, the convex portion is arranged between the cathode and the anode.

10. The X-ray generation apparatus according to claim 1, further comprising an insulating liquid that fills the internal space.

11. An X-ray imaging apparatus comprising:
an X-ray generation apparatus; and
an X-ray detection apparatus configured to detect X-rays radiated from the X-ray generation apparatus and transmitted through an object, wherein
the X-ray generation apparatus comprises:
an X-ray generation tube including a cathode having an electron emitting portion configured to emit electrons in a first direction, and an anode including a target configured to generate X-rays upon collision of the electrons radiated from the electron emitting portion;
a voltage supply configured to supply a voltage to the X-ray generation tube via a conductive line;
a storage container including a first portion configured to form a first space that stores the voltage supply, a second portion configured to form a second space whose width in a second direction orthogonal to the first direction is smaller than that of the first space and which stores the X-ray generation tube, and a connecting portion configured to connect the first portion and the second portion to each other to form an internal space in which the first space and the second space communicate, the connecting portion including a convex portion pointed toward the internal space; and
an insulating member arranged in the internal space to surround at least a portion of at least one of the conductive line and the cathode,
wherein the insulating member is arranged to block at least a shortest path between the conductive line and the convex portion, and
the insulating member has a structure formed by connecting at least two members by an adhesive material, and is configured to block a linear path between the adhesive material and the conductive line and a linear path between the adhesive material and the cathode.

* * * * *